Figure 1:
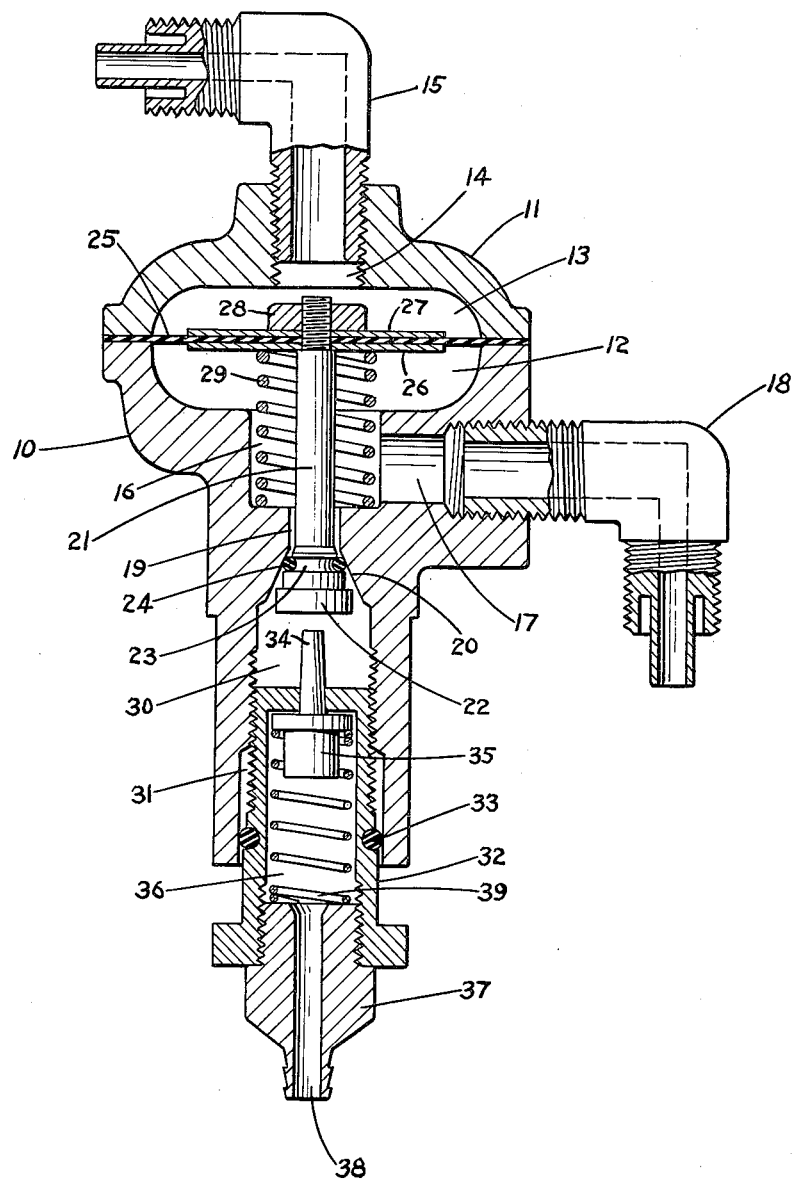

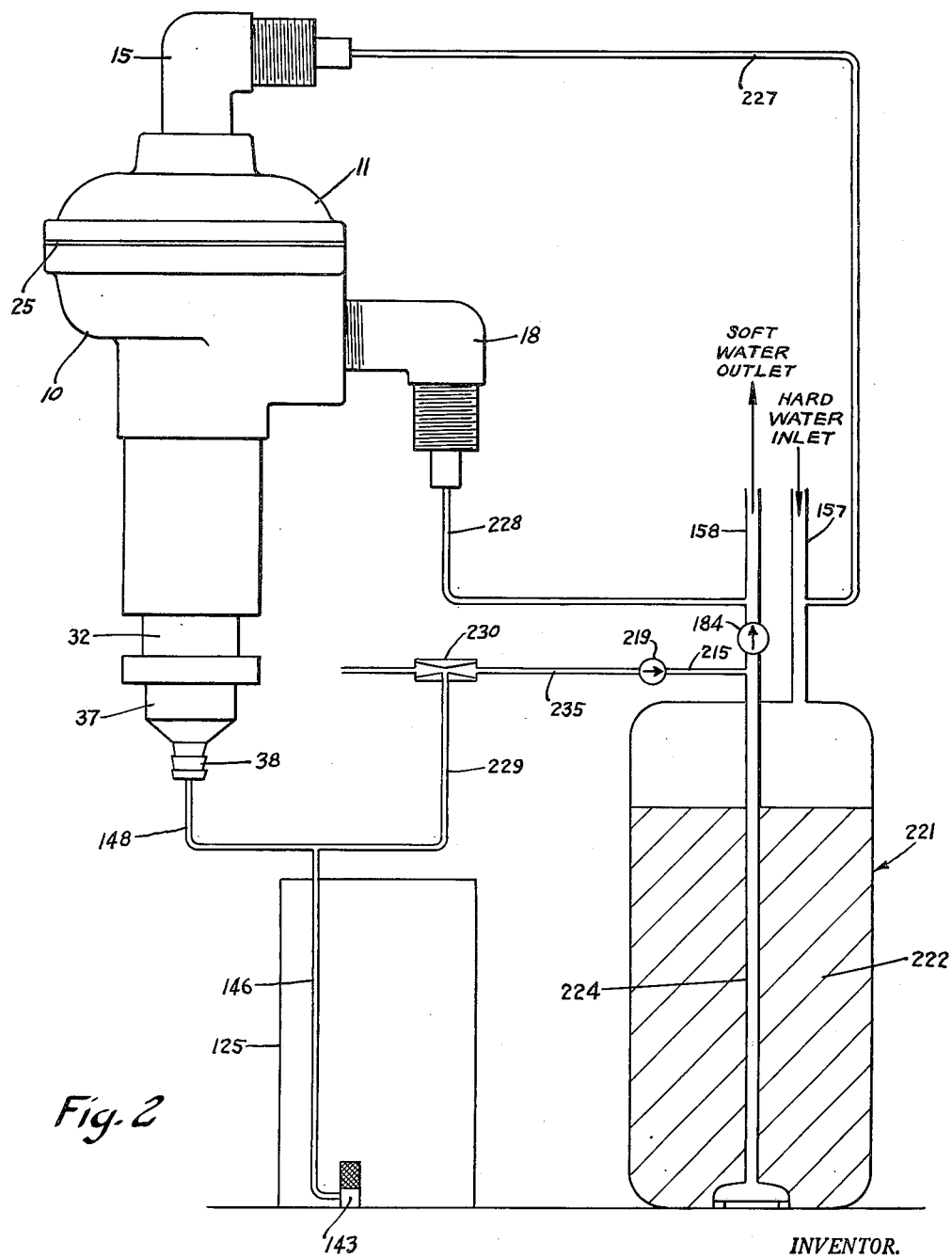

United States Patent Office 3,048,274
Patented Aug. 7, 1962

3,048,274
METERING VALVE
Stanley A. Lundeen, 2946 Stinson Blvd.,
Minneapolis 18, Minn.
Filed Aug. 7, 1957, Ser. No. 676,777
11 Claims. (Cl. 210—101)

This invention relates to a valve means for metering out a predetermined proportion of fluid passing through a flow line under pressure. More particularly, this invention relates to valve means for metering out water from a pressurized water flow line in a predetermined proportion of the water passing through the flow line.

The metering valve of this invention finds a special utility in water-softening systems and for convenience will be described in detail as used for that purpose. It will be understood, however, that the utility of the metering valve is not so limited. Water-softening systems presently in widespread use operate upon an ion exchange principle. It is well known that the so-called "hardness" in water is due principally to dissolved calcium and magnesium salts. It is well known to soften hard water by passing it through a bed of ion exchange material so that in the course of its passage through the ion exchange material, the calcium and/or magnesium ions are replaced by sodium ions from the exchange material.

The capacity of ion exchange materials to replace calcium and magnesium ions with sodium ions is, of course, not unlimited. After exhaustion, the ion exchange materials may, however, be regenerated by passing a solution containing sodium ions, usually a brine solution, through the bed of ion exchange material and the reverse reaction takes place wherein sodium replaces calcium and magnesium in the ion exchange material and the calcium and magnesium ions are flushed from the system as chlorides.

For any given water softener installation, the capacity of the bed of ion exchange material is known and the average hardness of the water used at that installation is also known. The average amount of water used at any given installation can readily be calculated. From these known facts the frequency with which the bed of ion exchange material must be regenerated to insure a constant supply of soft water can readily be calculated. Depending upon the capacity and volume of ion exchange material, the hardness of the water, and water consumption, the frequency with which the ion exchange material must be regenerated may vary widely from every day or two up to once every two weeks or so.

Because, in most installations, hard water is drawn at the soft water taps during the period of regeneration, it is customary that the regeneration cycle be carried out during periods of low water consumption, usually in the middle of the night. For this reason and because water consumption may fluctuate widely, it is the usual practice to provide a wide margin of safety so that the ion exchange material is regenerated before its exchange capacity has become exhausted in order that the user will be assured of a constant supply of soft water.

Thus, for example, in a typical installation of a completely automatic home water softening system, it may be determined on the basis of the volume and capacity of the water softener, the hardness of the water, and the average water consumption of the household that regeneration is necessary every fourth day. In order to provide for normal fluctuations in water consumption in such an instance, while still insuring a constant supply of soft water, the timing mechanism of the water softening system would be set so as to initiate the regeneration cycle every third day at an hour of low water consumption, such as 3:00 A.M. The one day margin of safety would safeguard against exhaustion of the bed of water softening material due to use of larger than normal amounts of soft water as would be occasioned by such circumstances as laundry days, a temporary increase in the size of the household caused by visitors, increased water consumption due to weather, etc. Thereafter, the bed of water softening mineral will be regenerated every third day at 3:00 A.M. regardless of the amount of water actually used. Thus, for example, if the householder is away for two-weeks vacation, his water softening system will regenerate itself every third day in spite of the fact that no water has been used. Since no hard water has passed through the system and regeneration is not therefore necessary, the brine and power required to carry out the useless regeneration cycle is wasted.

It is the principal object of this invention to provide a metering valve by which the water used to prepare a saturated brine solution for passage through the bed of ion exchange water softening material of a water softening system during the regeneration cycle, is metered into a brine generating vessel in fixed predetermined proportion to the amount of water consumed, whereby regeneration is dependent upon the amount of water consumed.

It is another object of this invention to provide a metering means whereby a predetermined proportion of fluid in a pressurized flow line is metered out from that flow line.

It is a further object of this invention to provide pressure-sensitive valving means adapted to meter out a predetermined proportion of fluid from a pressurized flow line upon a drop in pressure in that flow line.

It is a still further object of this invention to provide a combination valve means including a metering needle valve and a pressure-sensitive diaphragm actuated control valve therefor.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which: FIGURE 1 is a vertical sectional view illustrating the details of construction of the metering valve of this invention; and FIGURE 2 is a vertical elevation of the metering valve shown connected to a schematic representation of a water softening system in the softening cycle during which the metering valve functions.

Referring to the drawings, the metering valve of this invention includes a casing 10 and a cap 11 adapted to be secured thereto by means of screws or like conventional fastening means (not shown). The top surface of casing 10 is provided with a shallow bowl-shaped depression 12, which serves as a pressure chamber in the assembled valve. The bottom surface of the cap 11 is likewise provided with a shallow, bowl-shaped depression 13, which acts as a pressure chamber in the completed valve. The opposed faces of the casing 10 and cap 11 are smooth and flat in order to provide a tight fit when the valve is assembled. Cap 11 is provided with a tap 14 as an inlet to the pressure chamber 13. The tap 14 is provided with a fitting 15 by which the inlet may be connected to a source of fluid pressure.

The valve casing 10 is provided with a central annular channel 16, which serves as an extension of pressure chamber 12. The chamber extension 16 communicates with a tapped inlet 17, which is provided with a fitting 18 by which the pressure chamber 12 may be connected to a pressurized fluid flow line. The pressure chamber extension 16 is also provided with a central outlet channel or port 19 exiting from the pressure chamber. The outlet or port 19 is provided with an outer flaring valve seat 20 adapted to receive an O-ring valving member. The O-ring valving member includes a bolt-like stem 21 having an enlarged head 22 which is larger than the diameter of the outlet port 19. Below the enlarged head, the valve stem 21 is provided with an annular groove 23, fitted with a resilient O-ring 24 whose outer periphery seats against the valve seat 20.

A resilient diaphragm 25 is fitted between the opposed faces of the casing 10 and cap 11 so that when the cap is fastened into place on the casing, a fluid-tight seal is formed. The O-ring valving member is responsive to changes in pressure in the pressure chambers 12 and 13. To accomplish this, the threaded end of the O-ring valve stem 21 extends through a central opening in the diaphragm 25 and through reinforcing washers 26 and 27 on opposite sides of the diaphragm and is secured by a nut 28. The O-ring valving member is normally urged into closed position by means of a coil spring 29 surrounding the valve stem 21 seated in the bottom of the channel 16 and pushing against the washer 26.

The casing 10 is provided with a lower tapped channel 30 communicating with the outlet port 19 and an extension channel 31 of somewhat larger diameter. A threaded thimble or shouldered sleeve 32 is fitted into the channels 30 and 31. The outer periphery of thimble 32 is provided with an annular channel fitted with a resilient O-ring 33. The O-ring is intermediate of the ends of the thimble 32 so that when the thimble is threaded into the tapped channel 30, the O-ring slides with a tight sealing fit on the smooth walls of channel 31.

The thimble 32 has one closed end which is provided with a port or channel into which the needle 34 of a needle-valving member is fitted. The needle 34 is tapered and is integral with a base 35 of larger diameter which is disposed in the chamber 36 in the interior of the thimble 32. The open end of thimble 32 is tapped and is fitted with a nipple 37 having a port 38 which serves as outlet from the chamber 36. The needle valving member 34 is normally urged into closed position by means of a coil spring 39 which seats on a shoulder on the base 35 of the needle valving member and on the top of the nipple fitting 37.

The O-ring valving member 24 is responsive to changes of pressure in the pressure chambers 12 and 13. So long as the pressure in chamber 13 is less than the combined pressure of the fluid in chamber 12 plus the spring pressure of spring 29, the O-ring valve remains closed. So long as the O-ring valve remains closed, the needle valve likewise remains closed by virtue of the pressure of spring 39. When the fluid pressure in chamber 13 exceeds the combined spring and fluid pressure in chamber 12, the flexible diaphragm is moved so as to enlarge the volume of the pressure chamber 13 and in so moving, depresses the O-ring valve to unseat the O-ring 24 from the valve seat 20.

Immediately upon the opening of the O-ring valve, the fluid in the pressure chamber 12, the channel 16 and the port 19 is released and flows outwardly through the O-ring valve under pressure of incoming fluid supplied to fitting 18 and channel 17 from the pressurized soft water flow line to which the fitting is connected. This surge of fluid pressure into chamber 30 unseats the needle 34 of the needle valve permitting flow of fluid through the needle valve into the chamber 36 and out through the outlet 38. This is an instantaneous reaction, which occurs immediately upon opening of the O-ring valve before the head 22 of the O-ring valve stem contacts the needle 34 of the needle valve means and depresses the needle against the pressure of coil spring 39.

The needle valving element 34 is tapered to regulate the rate of flow to the port from chamber 30. The greater distance the needle valving element is depressed by the O-ring valve stem, the greater will be the rate of flow through the metering valve. The rate of flow is adjustable because of the adjustability of the thimble 32 in the sleeve forming channel 30. The farther the thimble 32 is screwed into the channel 30, the farther the O-ring valve stem will depress the needle valve and the greater will be the rate of flow.

The needle valving element is preferably so constructed that the broadened base member 35 will bottom against the end wall of the thimble 32 at the same time that the needle element 34 seats in the outlet port in the thimble end wall. In this way, the initial surge of fluid pressure in channel 30 is sufficient to unseat the needle valve and initiate flow of fluid from channel 30 even before the O-ring stem contacts the needle valving element. The fluid passed by the needle valve flows into channel 36 and out through the outlet port 38.

According to a typical installation of the metering valve according to this invention in a water softening system as shown in FIG. 2, the pressure chamber 13 is connected through fitting 15 and conduit 227 to the water main 157 on the hard-water side of the softening system. In this manner, the fluid pressure chamber 13 and the resilient diaphragm 25 are constantly subjected to the high pressure of the incoming water main. The fluid pressure chamber 12 and channel 16 are connected through fitting 18 and conduit 228 to the soft water delivery line 158 of the softening system. Normally, when no water is being drawn, the pressure in the soft water line 158 will be substantially equal to that in the hard water line 157 so that the pressure in chamber 12 will be equalized with that in chamber 13. To insure against any possible leakage when the diaphragm 25 is thus in a state of equilibrium, the pressure of coil spring 29 maintains the O-ring valve closed.

As soon as any soft water tap is opened there is an immediate drop in pressure in the soft water delivery line 158. Accordingly, there is an instant drop in pressure in the pressure chamber 12. Hard water from inlet 157 flows into the top of tank 221, through mineral bed 222, up through soft water discharge tube 224 and through check valve 184 to the soft water distribution system. Since the pressure of the hard water main is undiminished, the fluid pressure in chamber 13 remains substantially the same and is then greater than the pressure in chamber 12. The greater pressure against the flexible diaphragm 25 from pressure chamber 13 displaces the diaphragm in the direction of the reduced pressure zone in chamber 12 and in so doing, moves the valve stem 21 so as to unseat the O-ring 24 from the valve seat 20.

The instant the O-ring valve is opened, there is a surge of increased pressure in chamber 30 which unseats the needle valve and initiates a flow of fluid from the soft water line to a brine generating vessel 125 which receives the flow through conduits 148 and 146 from the outlet 38. The O-ring plunger contacts the needle valving element so as to open the needle valve a predetermined distance as determined by the depth to which the thimble 32 is screwed into the channel 30 of the valve casing 10. Thus, so long as water is flowing through the soft water delivery line 158, a predetermined small amount of that soft water flow is being diverted and metered through strainer 143 into the brine generating tank 125.

The amount of soft water which is metered into the brine tank is determined by the hardness of the water supply and the capacity of the water softening mineral 222 in the water softening tank 221 of the system. The volume of saturated brine required to regenerate the ion exchange material in the water softener is readily calculated. The soft water is metered into the brine tank 125 in such predetermined small proportion that a saturated brine solution of the required volume will be available for regeneration when the water softening capacity of the mineral bed is nearly depleted because of the volume of hard water which has passed through it. The brine tank 125 communicates with the water softening tank 221 through strainer 143, conduits 146 and 229, venturi 230, conduit 235, check valve 219, conduit 215 and tube 224 to permit flow of brine to the mineral bed 222 during regeneration. The saturated brine solution is formed only as needed. During periods of relatively high water consumption the brine will be prepared relatively faster in direct proportions to the amount of water used. Conversely, during periods of low water consumption, the brine will still be generated in proportion to the amount of water used but it will take a longer period in which to prepare a volume of brine adequate for regeneration of the water softening bed. During periods in which no water is used, no brine will be formed and no regeneration of the water softener will occur.

In an automatic water softening system, including the metering valve of this invention, the timing mechanism will be set to initiate the regeneration cycle at some convenient hour, such as, for example 3:00 a.m. The timing mechanism, as described and claimed in my co-pending application, Serial No. 693,481, filed October 30, 1957, includes a simple float means by which it is rendered inoperative to initiate the regeneration cycle except when a predetermined volume of brine is present in the brine tank as determined by the level of the float means.

During periods of high water consumption, the level of the brine solution will rise relatively rapidly and each day that the brine level is at the predetermined height to regenerate the bed of water softening mineral at the convenient time selected to initiate the regeneration, the float means will permit the timing mechanism to actuate the controls to initiate the regeneration cycle. On the other hand, each day when at the selected time the brine level is below the level indicated for regeneration, the regeneration cycle will be skipped for that 24-hour period.

As with existing automatic water softening systems, a margin of safety is provided so that the regeneration cycle begins before the water softening capacity of the bed is completely exhausted. Thus, if the level of the brine tank rises to the level which will permit initiation of the regeneration cycle between the time periods during which regeneration may be started, the margin of safety provided insures that soft water will be delivered until the next regeneration cycle is initiated. It will be seen that by means of the use of the metering valve of this invention, regenerating brine is prepared and the regeneration cycle is controlled by the volume of soft water used.

It is apparent that many modifications and variations of this invention as hereinbefore set forth may be made without departing from the spirit and scope thereof. The specific embodiments described are given by way of example only and the invention is limited only by the terms of the appended claims.

I claim:

1. Valve means for metering a predetermined proportional amount of fluid from a pressurized fluid flow line in response to variation of pressure in that line, said valve means comprising a valve body, a cavity in said body, a resilient diaphragm dividing said cavity into two fluid pressure chambers, said diaphragm being movable responsive to changes in fluid pressure in said chambers, fitting means in communication with the first of said chambers and adapted to connect said first chamber to a flow line at a point of constant high fluid pressure, fitting means in communication with the second of said chambers and adapted to connect said second chamber to the same flow line at a point of variable fluid pressure, an outlet port from said second chamber, a valving element positioned in and adapted to control flow from said port, said valving element being connected to said diaphragm for movement therewith responsive to variations in fluid pressure upon said diaphragm, a third chamber in communication with said port from said second chamber, a second outlet port from said third chamber, said second outlet port being aligned axially with said first named port, a variable flow valving element in said second outlet port in communication with said third chamber, said variable flow valving element being aligned axially with said first named valving element and closely spaced therefrom whereby said variable flow valving element is movable responsive to movement of said first named valving element, and adjusting means for varying the spacing between said valving elements for regulating the rate of flow from said chamber to set the predetermined proportional amount of fluid to be metered.

2. Valve means for metering a predetermined proportional amount of fluid from a pressurized fluid flow line in response to variation of pressure in that line, said valve means comprising a valve body, a first cavity in said valve body, a resilient diaphragm dividing said cavity into two pressure chambers, said diaphragm being movable responsive to changes in fluid pressure in said chambers, fitting means in communication with the first of said pressure chambers and adapted to connect said first pressure chamber to a flow line at a point of constant high fluid pressure, fitting means in communication with the second of said pressure chambers and adapted to connect said second chamber to the same flow line at a point of variable fluid pressure, a second cavity in said valve body, a first outlet port from said second pressure chamber communicating with said second cavity, said port being centrally disposed relative to said diaphragm, a control valving element positioned in said first port and adapted to control flow of fluid therethrough said control valving element being connected to said diaphragm and movable therewith responsive to movement of the diaphragm due to variations in fluid pressure thereon, a second outlet port from said second cavity, said second port being aligned axially with said first named port, an adjustable variable flow valving element positioned in said second port and adapted to control flow of fluid therethrough, said variable flow valving element being axially aligned with and closely spaced from said control valving element and operable in response to movement of said control valving element, the axis of alignment of said ports and valving elements being substantially perpendicular to the normal at-rest plane of said diaphragm, and means for varying the spacing between said valving elements to regulate the rate of flow through said valve means.

3. Valve means for metering a predetermined proportional amount of fluid from a pressurized fluid flow line in response to variation of pressure in that line, said valve means comprising a valve body, a first cavity in said valve body, a resilient diaphragm dividing said cavity into two pressure chambers, fitting means in communication with the first of said pressure chambers and adapted to connect said first pressure chamber to a flow line at a point of constant high fluid pressure, fitting means in communication with the second of said pressure chambers and adapted to connect said second chamber to the same flow line at a point of variable fluid pressure, a second cavity in said valve body, a first outlet port from said second pressure chamber communicating with said second cavity, a control valving element positioned in said first port to control flow of fluid therethrough, said control valving element being a resilient O-ring carried on a stem connected to said diaphragm and disposed and adapted to seat in a flared segment of the outlet port communicating between said second pressure chamber and said second valve body cavity, said control valving element being responsive to variations in fluid pressure on said diaphragm, a second outlet port from said second cavity, an adjustable, variable flow valving element positioned in said second port to control flow of fluid therethrough, said variable flow valving element being a tapered needle valve disposed axially with and spaced from said O-ring stem in closed valve position and operable to open valve position in response to movement of said stem into contact with the end of the needle valve, said ports and valving elements being axially aligned, the axis of alignment being substantially perpendicular to the normal at-rest plane of said diaphragm and means for varying the spacing between said valving elements to regulate the rate of flow through said valve means, said spacing varying means comprising a threaded closed end hollow cylindrical body extending into said second cavity, said second outlet port extending through the closed end of said body and being tapered from narrower toward the exterior of the closed end of the hollow cylindrical body to wider at the interior thereof, resilient spring means within said hollow cylindrical body to urge said needle valve into seating position in said second outlet port and further outlet means from said hollow cylindrical body for discharging said metered flow of fluid.

4. In an automatic water softening system comprising a tank of water softening mineral adapted to be connected to a hard water flow line, a soft water distribution line from said tank of water softening mineral and a brine tank in communication with said tank of water softening material adapted to contain salt for generation of brine for intermittent regeneration of said mineral, the improvement which consists in valve means for metering a predetermined proportion of water from a soft water flow line of said system into a brine generating tank, the amount of water metered into the brine tank being proportional to and dependent upon the volume of soft water consumed, said valve means comprising a valve body, a pressure responsive control valving element within said body adapted to pass a flow of water from a soft water flow line to a brine tank during periods of lower pressure in the soft water delivery line created by drawing of water from that line, and separate adjustable variable flow valving means for regulating the rate of said flow.

5. A water softening system according to claim 4 further characterized in that said pressure responsive valving element of said valve means is connected to a resilient diaphragm disposed between a pressure chamber connected to the hard water supply line to the water softening tank and another pressure chamber connected to the soft water delivery line from the same water softening tank.

6. A water softening system according to claim 5 further characterized in that said pressure responsive valving element is disposed in a port from the pressure chamber connected to the soft water delivery line to control flow of soft water from that chamber.

7. A water softening system according to claim 4 further characterized in that said adjustable, variable flow valving means is a needle valve responsive to movement of the pressure responsive valving element.

8. In an automatic water softening system comprising a tank of water softening mineral adapted to be connected to a hard water flow line, a soft water distribution line from said tank of water softening mineral and a brine tank in communication with said tank of water softening mineral for intermittent regeneration of said mineral, the improvement which consists in providing valve means for metering a predetermined amount of soft water from the soft water delivery line into the brine generating tank, the amount of soft water metered into the brine tank being dependent upon the volume of soft water consumed, said valve means comprising a valve body, a cavity in said body, a resilient diaphragm dividing said cavity into two fluid pressure chambers, fitting means in communication with the first of said chambers and adapted to connect said first chamber to the hard water flow line of the system, said hard water flow line being at constant high fluid pressure, fitting means in communication with the second of said chambers and adapted to connect said second chamber to the soft water distribution line of the system, pressure within the soft water distribution line being variable depending upon use of soft water, an outlet port from said second chamber, a valving element adapted to control flow from said port, said valving element being positioned in said port and connected to said diaphragm for movement therewith responsive to variations in fluid pressure upon said diaphragm created by drawing of soft water to open and close said port, a third chamber in communication with said port from said second chamber, a second outlet port from said third chamber, a resiliently mounted variable flow valving element positioned in said second outlet port in communication with said third chamber adapted to control flow from said second port, said outlet ports and valving elements being axially aligned, said valving elements being closely spaced apart whereby said variable flow valving element is movable, responsive to movement of said first named valving element, and adjusting means for varying the spacing between said valving elements for regulating the rate of flow from said chamber to set the predetermined proportional amount of fluid to be metered.

9. A water softening system according to claim 8 further characterized in that said pressure responsive valving element is an O-ring carried on a stem connected to said diaphragm and disposed and adapted to seat in an outer flared segment of said outlet port.

10. A water softening system according to claim 9 further characterized in that said variable flow valving element is a tapered needle valve axially aligned with said pressure responsive valving element and operable in said second outlet port in response to movement of the pressure responsive valving element.

11. In a water softening system, valve means according to claim 8 further characterized in that said adjusting means for regulating the rate of flow from the valve comprises a threaded closed end hollow cylindrical body extending into said third chamber, said second outlet port extends through the closed end of said body and is tapered from narrower toward the exterior of the closed end of the hollow cylindrical body to wider at the interior thereof, said variable flow valving element is a needle valve positioned in said second outlet port, resilient spring means are disposed within said hollow cylindrical body to urge said needle valve into seating position in said second outlet port and further outlet means extend through said hollow cylindrical body for discharging said metered flow of fluid.

References Cited in the file of this patent

UNITED STATES PATENTS

| | | |
|---|---|---|
| 1,185,626 | Brown | June 6, 1916 |
| 1,264,006 | Bucknam | Apr. 23, 1918 |
| 1,521,765 | Guerrant | Jan. 6, 1925 |
| 1,697,095 | Turner | Jan. 1, 1929 |
| 2,016,331 | Junkers | Oct. 8, 1935 |
| 2,042,178 | Lauterbur | May 26, 1936 |
| 2,265,225 | Clark | Dec. 9, 1941 |
| 2,452,956 | Robins | Nov. 2, 1948 |
| 2,490,511 | Courtot | Dec. 6, 1949 |
| 2,637,690 | Everson | May 5, 1953 |
| 2,660,834 | MacGlashan | Dec. 1, 1953 |
| 2,855,951 | Orth | Oct. 14, 1958 |
| 2,906,288 | Young | Sept. 29, 1959 |